United States Patent [19]

Henton

[11] Patent Number: 4,619,968
[45] Date of Patent: Oct. 28, 1986

[54] FLAME RESISTANT CARBONATE BLENDS

[75] Inventor: David E. Henton, Midland, Mich.

[73] Assignee: The Dow Chemical Company, Midland, Mich.

[21] Appl. No.: 764,364

[22] Filed: Aug. 12, 1985

[51] Int. Cl.⁴ .............................................. C08L 69/00
[52] U.S. Cl. ..................................... 525/67; 523/201; 525/148; 260/DIG. 24
[58] Field of Search ................. 525/67, 148, 468, 902; 260/DIG. 24; 523/201

[56] References Cited

U.S. PATENT DOCUMENTS 4,180,494 12/1979 Fromuth et al. ................... 523/201

Primary Examiner—Theodore E. Pertilla

[57] ABSTRACT

Carbonate polymer blend compositions which exhibit flame resistant properties comprising a carbonate polymer and grafted rubber compound in which at least a portion of the grafted on the rubber backbone is a flame resistant polymer.

13 Claims, No Drawings

FLAME RESISTANT CARBONATE BLENDS

BACKGROUND OF THE INVENTION

This invention relates to carbonate polymer compositions, and in particular to carbonate polymer compositions which exhibit flame resistant properties.

Carbonate polymers derived from reactions of dihydroxyorganic compounds, particularly the dihydric phenols, and carbonic acid derivatives such as phosgene, have found extensive commercial application because of their excellent physical properties. These thermoplastic polymers are suitable for the manufacture of molded parts wherein impact strength, rigidity, toughness, heat resistance and excellent electrical properties are required.

Unfortunately, however, these polymers exhibit a brief but definite burning time when contacted with an open flame. More importantly, as is often the case, the carbonate polymers contain stabilizers and other additives which are often more combustible than the unmodified carbonate polymer. In particular, rubber-modified polycarbonates are commercially important examples of a carbonate polymer containing a more combustible additive. Rubber is incorporated into polycrbonate to improve the low temperature and sharp notch (i.e., 5 mil Izod) impact resistance. When ignited these rubber components give off flammable vapors. As a result, the modified carbonate polymers frequently exhibit substantially poorer resistance to combustion than does the unmodified carbonate polymer.

In attempts to increase the combustion resistance of carbonate polymers including the modified forms thereof, it has been a common practice to employ monomeric phosphites, phosphoric acid esters, thiophosphoric acid esters containing halogenated alkyl radicals and halogenated organic compounds into the carbonate polymer. However, in order to obtain any significant improvement in combustion resistance, these additives are frequently employed in such large quantities that they often adversely affect many of the desirable physical, optical or mechanical properties of the carbonate polymer.

In view of the deficiencies of conventional fire retardant carbonate polymer compositions, it would be highly desirable to provide a carbonate polymer composition exhibiting good toughness and having improved resistance to burning when exposed to an ignition source.

SUMMARY OF THE INVENTION

The present invention is a composition comprising (1) a continuous phase comprising an aromatic carbonate polymer and (2) a discontinuous phase dispersed in said continuous phase comprising an elastomeric particle in the form of a grafted rubber concentrate which comprises a functionally effective amount of crosslinking and which further is grafted with a functionally effective amount of a polymer capable of exhibiting flame resistant properties.

The fire retardant carbonate polymer compositions of the present invention are suitably employed in most applications in which polycarbonates have been previously utilized. Applications of particular interest for the utilization of the said carbonate polymer compositions of this invention are as follows: automobile parts, e.g., air filters, fan housings, exterior components, housings for electrical motors, appliances, business and office equipment, photographic equipment, lighting and aircraft applications.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl)alkylidenes (often called bisphenol A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the aromatic polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,287,787; 4,156,069; 4,260,731 and 4,105,633. Of the aforementioned carbonate polymers, the polycarbonates of bisphenol A and derivatives, including copolycarbonates of bisphenol A, are preferred. Methods for preparing carbonate polymers for use in the practice of this invention are well known, for example, several suitable methods are disclosed in the aforementioned patents which are hereby incorporated by reference in their entirety.

The elastomeric particle compositions useful in this invention which are in the form of grafted rubber concentrates are those types of particles as are described in U.S. Pat. No. 4,419,496 which is incorporated herein by reference in its entirety. Other elastomeric particles are disclosed in U.S. Pat. No. 3,830,878 which is incorporated herein by reference. Generally, particles are composed of aliphatic conjugated dienes such as 1,3-butadiene or acrylate homopolymers or interpolymers, and range in size from about 300 Å to about 20,000 Å in diameter. The amount of elastomeric material typically ranges from about 15 to about 90, preferably from about 25 to about 80, weight percent in the form of polymerized butadiene, isoprene, acrylate monomers such as 2-ethylhexyl acrylate and butylacrylate, and the like; which is grafted with a polymer containing a functionally reactive group.

The elastomeric particles of this invention are those which can have a functionally effective amount of crosslinking. By this is meant that the elastomeric or rubbery component is not completely soluble in a suitable solvent for the elastomeric or rubbery component. That is, the elastomeric or rubbery component of the grafted rubber concentrate forms a gel and swells in the solvents, but does not dissolve. Typically, in such a situation, the percent gel ranges from about 50 to about 95 percent, and the swelling index ranges from about 3 to about 50.

The elastomeric particles are those particles comprising a substrate of an elastomeric or rubbery component and having grafted thereto vinyl polymer component. The vinyl polymer component can be described as a polymer capable of exhibiting flame resistant properties. Typically, the amount of vinyl polymer attached phase which is grafted to the elastomeric or rubbery component ranges from about 10 to about 90 weight percent of the total vinyl polymer component which is polymerized in the presence of the elastomeric or rubbery component. The minimum amount of graft which is employed is that amount sufficient to allow dispersion of the elastomeric particles in the polycarbonate phase. The amount will vary depending upon factors such as the particle size of the dispersed phase particles. For example, the use of smaller size will typically require the use of greater amounts of graft polymer. A particle size of 1,000 Å typically requires at least 5 parts of graft polymer to 100 parts of rubber. A preferred range ranges from about 10 to 100 parts of graft polymer to about 100 parts of rubber.

The graft polymer molecular weight can vary and generally ranges from about 10,000 to about 250,000. The graft weight average molecular weight can be determined using techniques such as gel permeation chromotography on the non-attached phase in the grafted rubber concentrate. The molecular weight can be varied by reaction conditions and additives well known in the art.

The elastomeric or rubbery components include conjugated dienes, acrylate rubbers and interpolymers of the type disclosed in U.S. Pat. No. 4,419,496. The grafted or vinyl polymer attached phase polymers provide a compatibilizing interface which allows for dispersion of rubber particles in the carbonate polymer. Typically grafted or attached phase polymers comprise polymerized styrenics, acrylates and methacrylates, acrylonitrile monomers, acrylic acids, methacrylic acids, hydroxypropyl acrylate, hydroxyethyl acrylate, and the like, and combinations thereof. The amount of monomer which contains such flame resistant properties and which is polymerized in the attached polymer phase ranges from about 10 to about 100 weight percent based on the monomers polymerized during the graft polymerization. Preferred combinations of monomers which polymerize to form attached phase polymers containing monomers with flame resistant properties include styrene/bromostyrene, styrene/acrylonitrile/brominated styrene, styrene/methylmethacrylate/brominated styrene, di- and tribromostyrene polymers and interpolymers with acrylonitrile, methylmethacrylate as well as halogen containing alkyl acrylate and methacrylate.

Examples of monomers which provide flame resistant properties to the attached polymer phase include bromostyrene, dibromostyrene, tribromostyrene chlorostyrene, di- and trichlorostryene.

The properties of the dispersion are influenced by a variety of factors including the identity of the components, the particle size and concentration of the disperse phase, the hardness or softness of the particles of the disperse phase, the concentration and nature of the graft phase, and many other factors.

For most practical applications, the stability of the dispersion and the property enhancement due to the dispersed phase will be optimized with particles that are less than some critical particle size which is about 20 microns. Typically, the elastomeric particles range in size from about 300 Å to about 20,000 Å, more desirably from about 900 Å to about 1,500 Å, in diameter. If desired, mixtures of elastomeric particles of various sizes can be employed (e.g., a mixture of 8,000 Å particles and 1,000 Å particles) which particles are obtained, for example, by agglomeration of smaller size particles or selective growth of particles. In a situation wherein a mixture of particles of various sizes is employed, the bimodal mixture is particularly desired, and the small size particles preferably range from about 900 Å to about 1,500 Å in diameter, while the large size particles range from about 4,000 Å to about 10,000 Å in diameter.

The fire retardant carbonate polymer compositions of the present invention are suitably prepared by combining the carbonate polymer with an effective amount of fire retardant additive using any of a variety of blending procedures conventionally employed for incorporating additives into carbonate polymer resins. For example, dry particulates of the carbonate polymer and the fire retardant additive can be dry blended and the resulting dry blend extruded into the desired shape. By "effective amount" is meant that combination of the desired fire retardant additive components that is sufficient to provide improved fire retardant character to the carbonate polymer with which it is blended.

While any amount of the grafted rubber concentrate fire retardant additive that imparts to the carbonate polymer an improved fire retardancy is suitable, preferred amounts of the fire retardant additive are in the range from about 0.5 to about 50, especially from about 2 to about 20, weight percent based on the weight of the carbonate polymer plus grafted rubber concentrate fire retardant additive.

Fire retardant carbonate polymer compositions are considerably more difficult to ignite than unmodified carbonate polymer resins or carbonate polymer compositions containing only the grafted rubber additive components. The fire retardant carbonate polymer compositions of this invention can rapidly form a char at the surface of the sample once ignition is achieved. In addition, the compositions of this invention burn for a much shorter time than unmodified carbonate polymer resins or carbonate polymer compositions containing a grafted rubber additive without the flame retardant monomer component.

In addition to the aforementioned fire retardant grafted rubber additives, other additives can be included in the carbonate polymer composition of the present invention such as additional rubbers, polymers, fillers (i.e., a tetrafluoroethylene polymer or glass fibers), pigments, dyes, antioxidants, stabilizers, ultraviolet light absorbers, mold release agents and other additives commonly employed in carbonate polymer compositions.

The following example is given to further illustrate the invention and should not be construed as limiting its scope. In the following examples, all parts and percentages are by weight unless otherwise indicated.

EXAMPLE 1

In to a 1-gallon glass reactor is charged 2689 g of a dispersion of a rubber latex. The latex dispersion contains 890 g rubber solids which solids represent 5 percent styrene, 93 percent butadiene and 2 percent acrylonitrile polymerized to yield a mixture of 56 percent diamter 8000 Å and 44 percent diameter 1400 Å solid particles. (The dispersion is stabilized with 0.92 percent sodium dodecylbenzene sulfonate soap.) The reactor is flushed with nitrogen and heated while under agitation at 150 rpm. When the reactor temperature reaches about 80° C., an aqueous stream containing 0.26 percent sodium peroxydisulfate, 0.98 percent sodium dodecyl benzene sulfonate soap and 98.76 percent water is added at a rate of 137 g/hr over a 5-hour period. Simultaneously with the aqueous stream is added a monomer stream containing about 56.6 percent monobromostyrene, 43.4 percent styrene and 0.20 parts (based on monomers) of n-octylmercaptan over the same 5-hour period at the rate of 120 g per hour. The reaction mixture is heated at a reactor temperature of 80° C. for an additional 30 minutes. The conversion of monomers is 95.7 percent. The mixture is then steam stripped in order to remove residual monomer. To the mixture is added stabilizing antioxidant. The grafted rubber resin so formed is isolated using freeze coagulation techniques and air dried. Extraction of the dry product with a methyl ethyl ketone/toluene (1/1) mixture shows the resin to have 55 percent graft and the soluble non-attached rigid phase has a weight average molecular of 33,000 by gel permeation versus a polystyrene standard. The sample is designated Sample No. 1.

For comparison purposes is provided grafted rubber concentrate of the type described hereinbefore but which resin does not contain the flame retardant monomer.

The non-flame retardant grafted rubber concentrate is prepared in a similar manner to the above product. However, no bromostyrene monomer is used in the monomer mixture. The sample is designated as Sample No. C-1.

Blends of the two grafted modifiers with homopolycarbonate of bisphenol A and having molecular weight of 32,000 are prepared by melt mixing 10 parts of the respective grafted rubber concentrate with 90 parts of polycarbonate on a 0.8 inch Welding Engineers Twin Screw Extruder. Injection molded test parts are prepared on a 2 ounce Negri Bossi molding machine having a barrel temperature of 525° F. and 175° F. mold temperature. The samples are tested and the results shown in Table I.

TABLE I

| Sample | Ty[1] | Percent Elongation[2] | 10 mil[3] Izod Impact | 5 mil[4] Izod Impact | Resistance to Burning[5] | |
|---|---|---|---|---|---|---|
| | | | | | 1st Flame Application | 2nd Flame Application |
| 1 | 7390 | 154 | 12.8 | 12.3 | 1.8 seconds | 11.6 seconds |
| C-1* | 7680 | 105 | 14.4 | 12.1 | Burns | Burns |
| C-2* | 8500 | 125 | 16 | 1.5 | Burns | Burns |

*Not an example of the invention. Sample No. C-2 is polycarbonate.
[1]Tensile yield, ASTM D-638 at 0.2 inches/minute, reported in lbs/inch².
[2]Elongation, ASTM D-638 at 0.2 inches/minute, percent.
[3]Izod impact strength, ASTM D-256 with a 10 mil notch, reported in ft-lbs/inch of notch.
[4]Izod impact strength, ASTM D-256 with a 5 mil notch, reported in ft-lbs/inch of notch.
[5]Time required to self extinguish flame after flame application to ½ inch by ⅛ inch vertical mounted parts according to UL94 test.

The data in Table I indicate that these halogen containing grafted rubber concentrates improve both the resistance to burning and the sharp notch toughness of polycarbonates.

What is claimed is:

1. A composition comprising:
   (1) a continuous phase comprising an aromatic carbonate polymer and
   (2) having dispersed therein an elastomeric particle material in the form of a grafted rubber concentrate which comprises
      (a) a functionally effective amount of crosslinking
      (b) which is further grafted with a functionally effective amount of a vinyl polymer capable of exhibiting flame resistant properties.

2. A composition of claim 1 wherein said aromatic carbonate is bisphenol A.

3. A composition of claim 1 wherein said aromatic carbonate polymer is a derivative of bisphenol A.

4. A composition of claim 1 wherein said aromatic carbonate polymer is a copolycarbonate of bisphenol A.

5. A composition of claim 1 wherein said elastomeric particle material comprises the polymerized product of aliphatic conjugated dienes, acrylate homopolymers, or interpolymers thereof.

6. A composition of claim 5 wherein said elastomeric particle ranges in size from about 300 Å to about 20,000 Å in diameter.

7. A composition of claim 5 wherein said elastomeric component of the particles ranges from about 15 to about 90 weight percent of the grafted rubber concentrate.

8. A composition of claim 6 wherein said elastomeric component of the particles ranges from about 25 to about 80 weight percent of the grafted rubber concentrates.

9. A composition of claim 1 wherein said vinyl polymer capable of exhibiting flame resistant properties comprises polymerized styrenics, acrylates, methacrylates, or acrylonitrile.

10. A composition of claim 9 wherein the vinyl polymer capable of exhibiting flame resistant properties is formed from a monomer mixture comprising a halogenated monomer selected from the group consisting of bromostyrene, dibromostyrene, tribromostyrene, chlorostyrene, dichlorostyrene and trichlorostyrene.

11. A composition of claim 10 wherein the amount of said halogenated monomer ranges from about 10 to about 100 weight percent based on the monomers polymerized during the graft polymerization.

12. A composition of claim 1 wherein the amount of grafted rubber concentrate ranges from about 0.5 to about 50 weight percent based on the weight of aromatic carbonate polymer plus grafted rubber concentrate.

13. A composition of claim 1 wherein the amount of grafted rubber concentrate ranges from about 2 to about 20 weight percent based on the weight of aromatic carbonate polymer plus grafted rubber concentrate.

* * * * *